July 8, 1969

E. FEDER ET AL 3,454,242

FLOATING PNEUMATIC THRUST CYLINDER
FOR AIRCRAFT LAUNCHING SYSTEM
Filed Jan. 18, 1967

PRIOR ART

INVENTORS
ERNEST FEDER
JOHN KRANSNITSKI
PETER T. VERCELLONE

BY *Melvin Pearson Williams*

ATTORNEYS

United States Patent Office 3,454,242
Patented July 8, 1969

3,454,242
FLOATING PNEUMATIC THRUST CYLINDER FOR AIRCRAFT LAUNCHING SYSTEM
Ernest Feder, Hartford, John Kransnitski, East Hampton, and Peter T. Vercellone, New Haven, Conn., assignors to United Aircraft Corporation, East Hartford, Conn., a corporation of Delaware
Filed Jan. 18, 1967, Ser. No. 610,130
Int. Cl. B64f 1/06; F01b 29/00
U.S. Cl. 244—63                          1 Claim

ABSTRACT OF THE DISCLOSURE

A cylinder, similar to that used in a catapult, has a cross section of inverted omega design, the transverse plates of which supply vertical support and hoop strength continuity, whereby the cylinder may be mechanically independent of and thermally insulated from a primary support such as a foundation.

Cross-references to related applications

An aircraft launching system having a long pneumatic cylinder, within which the present invention may be utilized, is illustrated in a copending application of the same assignee entitled, Aircraft Launching, filed by John M. Tyler on even date herewith, Ser. No. 610,132.

Background of the invention

*Field of the invention.*—This invention relates to improvements in the pneumatic thrust cylinder of an aircraft launching system.

*Description of the prior art.*—In aircraft launching systems known to the art, the problems in cylinder structure resulting from the longitudinal slot creating structural discontinuity in the cylinder, which in turn causes loss of hoop strength, have been treated by constructing the cylinder in as nearly a rigid fashion as possible. Thus, some cylinders have been embedded in concrete, and other cylinders are provided with structural support frames of a heavy nature, whereby the tendency of the cylinder to open up as a result of internal pressures has been resisted by the structural strength of material external to the cylinder. Examples of this type of cylinder structure are included in U.S. Patents Nos. 2,675,284 and 2,703,211. Such cylinders must be manufactured and aligned, with respect to the rest of the launching system, to very close tolerances to avoid high friction resistance to the piston which causes hot spots and excessive wear. Certain of these shortcomings of the prior art may be overcome by a suitable seal which provides hoop continuity to the cylinder. However, such devices, even with proper hoop continuity provided by a seal have additional limitations which relate to thermal expansion. In a system such as is disclosed in the aforementioned Tyler application, the pneumatic thrust cylinder may be on the order of two and one-half miles long. If temperatures of approximately 1000° F. obtain within the cylinder, thermal expansion of the entire launching system may reach 100 feet. Obviously, this would be an insurmountable practical limitation.

Summary of the invention

An object of the present invention is to provide a pneumatic thrust cylinder for an aircraft launching system having improved hoop continuity.

Another object of the present invention is to provide a pneumatic thrust cylinder which is capable of operating at high temperatures in embodiments having very long lengths without undue thermal expansion.

According to the present invention, the sole vertical support, for a pneumatic thrust cylinder of the type having an elongated slot extending longitudinally thereof, is provided by transverse plates depending from the edges of said slot, such that the cross section of the cylinder is of an inverted omega design. Hoop strength (that is, the ability to withstand radial forces) is provided by the tangential positioning of the aforesaid plates. Since both support and hoop strength are provided by the cross-sectional design of the cylinder itself, the cylinder need not be embedded in concrete nor supported by heavy steel structural members, as is required in designs heretofore available. This permits the use of somewhat flexible thermal insulation material between the foundation or other structural base of the cylinder and the cylinder itself, whereby the cylinder is free to move by small amounts at different points along the length thereof so as to conform to the motion of a launching assembly which is driven along the slot thereof as a result of a piston being pneumatically pressed therethrough. Additionally, high operating temperatures operating on the piston within the cylinder are not transferred directly to the foundation, whereby thermal expansion of the foundation or other structural support is mitigated.

The invention in accordance herewith permits utilization of pneumatic thrust cylinders having extremely long length (such as several miles) while operating at high temperatures (such as 1000° F.) without undue thermal expansion of foundations or other supports (such as 100 feet per several linear miles). The invention further eliminates the necessity of having finely machined cylinders within which a piston may travel over a distance of several miles without creating hot spots or undue wear, since the cylinder is free to move in transverse directions by small increments to accommodate similar motions of a launching mechanism which is being impelled therethrough.

Other objects, features and advantages of the present invention will become more apparent in the light of the following detailed description of a preferred embodiment thereof as illustrated in the accompanying drawing.

Description of the preferred embodiment

Figure 1:
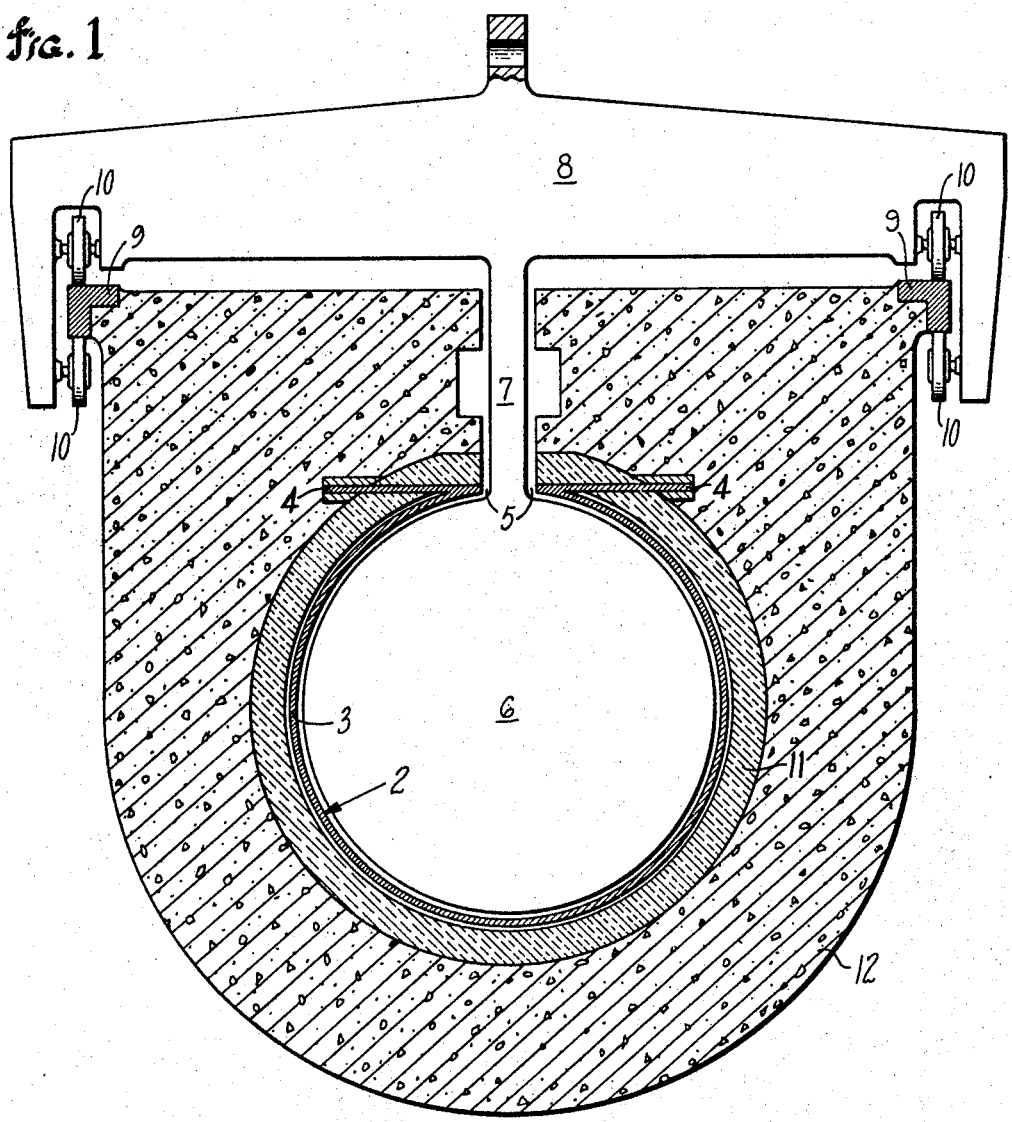
FIGURE 1 is a cross-sectioned elevation of a pneumatic thrust cylinder, and piston driven launching assembly used therewith, in accordance with the present invention.

Referring to FIGURE 1, a cylinder 2 includes a generally cylindrical portion 3 and a pair of transverse plate portions 4 which are joined to the cylindrical portion 3 at a discontinuity therein which forms a slot 5. Plate portions 4 are joined tangentially of the cylindrical portion 3. Within the cylinder 2, a piston 6 is disposed for longitudinal travel, the piston 6 being connected by a vertical frame member 7 to a cart 8 (or other launching device structure). The cart 8 may be disposed for confined rolling on rails 9 by complementary pairs of wheels 10.

Surrounding the cylinder 2 is a layer of thermal insulation 11 which may comprise any suitable fiberous insulation material. The entire structure may be supported and oriented by a foundation 12.

Figure 2:
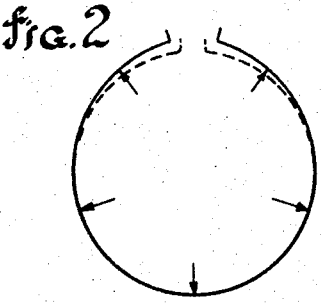
FIGURE 2 is a diagrammatic illustration of forces within the cylinder and distortion which results therefrom when not compensated.

The cylinder 2 undergoes direct membrane stresses in a radial direction (as indicated by the arrows in FIG. 2) as a result of high pneumatic pressure which is supplied thereto so as to drive the piston longitudinally thereof in order to cause the cart or other launching mechanism to pull an aircraft during takeoff. In a perfect cylinder of suitable strength, the cylinder will achieve roundness, naturally, as a result of this radial pressure. However, the discontinuity in the hoop strength of the cylinder 2 which is caused by the slot 5 formed therein (said slot being necessary to permit passage of the structural member 7) causes a tendency to open the cylinder 2 as a result of the internal pressures, as shown by the solid line in FIG. 2. This tendency is, however, offset by the inward force exerted by the foundation 12 against the transverse plates 4, FIG. 1. Thus, the transverse plates 4 prevent a tendency toward opening of the cylinder as a result of the internal pressures therein. Additionally, the plates 4 supply vertical strength to the cylinder to support it within the foundation 12, without requiring the foundation 12 to be in adjacent supporting relationship therewith. This permits the cylinder 2 to move slightly relative to the foundation 12 such as may be required in order to accommodate slight variations in track alignment or in stresses imparted to the cart 8 as a result of towing an aircraft. Additionally, since the transverse plates 4 support the cylinder 2 away from the foundation 12, insulation material 11 may be provided to thermally insulate the foundation 12 from the high temperatures which obtain within the cylinder 2 as a result of the expanding gas used therein to drive the piston 6. Thus, quantities of heat which may otherwise be transferred to the foundation 12 are insulated therefrom, so that the foundation 12 will not undergo undue thermal expansion which, over a long length (such as several miles as contemplated within the system of said Tyler application) could otherwise result in a mechanically impractical system. The plates 4 may be disposed on the foundation 12 in any manner suitable to the design requirements of any given utilization of the present invention.

Although the invention has been shown and described with respect to a preferred embodiment thereof, it should be obvious to those skilled in the art that various changes and omissions in the form and detail thereof may be made therein without departing from the spirit and scope of the invention.

Having thus described a preferred embodiment of our invention, what we claim as new and desire to secure by Letters Patent of the United States is:

1. A below ground pneumatic thrust cylinder for an aircraft launching system comprising a substantially cylindrical member having an elongated slot extending longitudinally thereof, said member including longitudinal plates on each side of said slot extending transversely of said slot, said plates being formed integrally with said substantially cylindrical member and tangential to cylindrical portions thereof at the intersections thereof with said slot; concrete foundation means embedded in the ground having a generally cylindrical void therein, said void being of a diameter larger than said member, the transverse plates being embedded in the foundation means so as to provide the sole support for said member, the member being disposed within said void, a space being formed between the member and said foundation means, said space containing a layer of thermal insulation material.

References Cited

UNITED STATES PATENTS

| | | | |
|---|---|---|---|
| 436,946 | 9/1890 | Kelly | 104—161 |
| 680,843 | 8/1901 | Comstock | 104—156 |
| 2,675,284 | 4/1954 | Mitchell | 92—88 |
| 2,703,211 | 3/1955 | Hinchman et al. | 244—63 |
| 2,926,872 | 3/1960 | Fulton et al. | 244—63 |
| 2,200,427 | 5/1940 | Merz | 244—63 |
| 2,497,916 | 2/1950 | Stambaugh | 244—63 |
| 2,792,755 | 5/1957 | Lahde | 244—63 |

MILTON BUCHLER, *Primary Examiner.*

P. E. SAUBERER, *Assistant Examiner.*

U.S. Cl. X.R.

92—88